Oct. 4, 1955  E. A. WATSON  2,719,705
COATING OVERSPRAY REMOVING APPARATUS
Filed Aug. 30, 1952  2 Sheets-Sheet 1
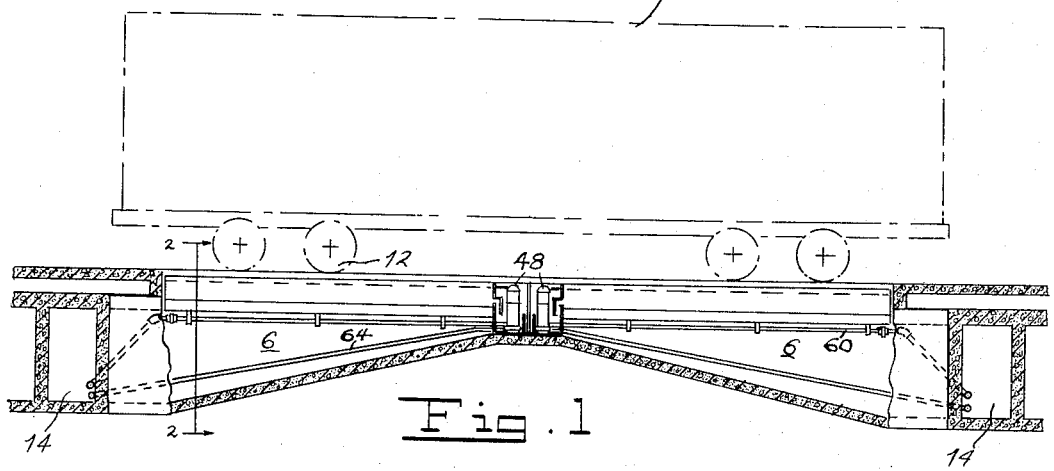
Fig. 1
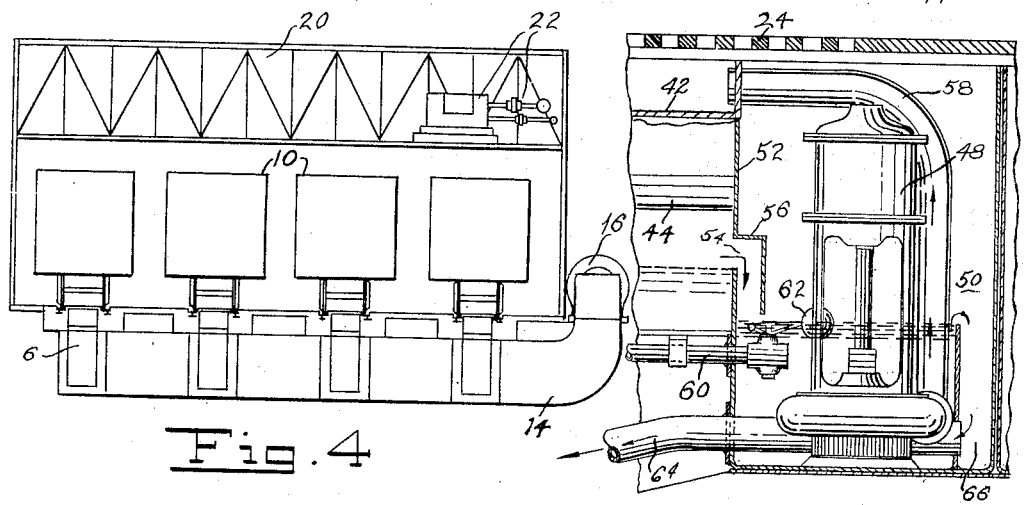
Fig. 4
Fig. 3
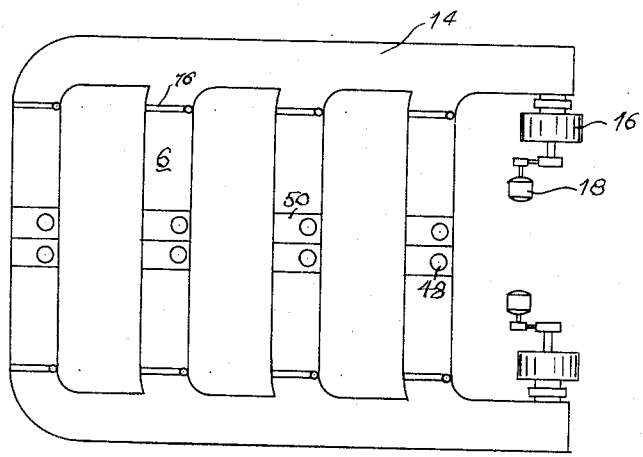
Fig. 5
INVENTOR
EDMUND. A. WATSON
BY
George R. Ericson
ATTORNEY Oct. 4, 1955 E. A. WATSON 2,719,705
COATING OVERSPRAY REMOVING APPARATUS
Filed Aug. 30, 1952 2 Sheets-Sheet 2

INVENTOR
EDMUND. A. WATSON
BY
George R. Ericson
ATTORNEY

United States Patent Office 2,719,705
Patented Oct. 4, 1955

2,719,705

COATING OVERSPRAY REMOVING APPARATUS

Edmund A. Watson, Ridgewood, N. J., assignor to ACF Industries, Incorporated, a corporation of New Jersey Application August 30, 1952, Serial No. 307,257

6 Claims. (Cl. 261—29)

This invention relates to an improved apparatus for removing paint or similar coating overspray from air, of the water wash type, particularly for use in the spray painting of railway cars and the like.

Heretofore, apparatus of this type has usually included cumbersome casings, reservoirs, flow plate, ducts and the like, which are expensive to manufacture and often fail in their intended purpose of effectively cleansing the stream of air passing therethrough.

It is an object of the present invention to provide a compact, self-contained apparatus for effectively removing over-spray incident to a paint spraying operation from a current of air being drawn through the zone thereof.

Another object of the invention is the provision of an apparatus as above described in which all the overspray removing elements are contained in a single tank, including baffles which also form an air outlet passage through the bottom of the tank.

These and other objects of the invention will be apparent to those skilled in the art from a study of the following description taken with the accompanying drawings, in which:

Fig. 1 is a longitudinal sectional view through an air discharge trough cut in the concrete floor of a paint shop or shed showing the apparatus as installed therein;

Fig. 3 is an enlarged fragmentary view showing one end of the apparatus;

Fig. 4 is a digrammatic end elevational view showing the general arrangement of a plurality of the apparatus as installed in a paint shop or shed; and Fig. 5 is a diagrammatic plan view of the arrangement shown in Fig. 4.

Figure 2:
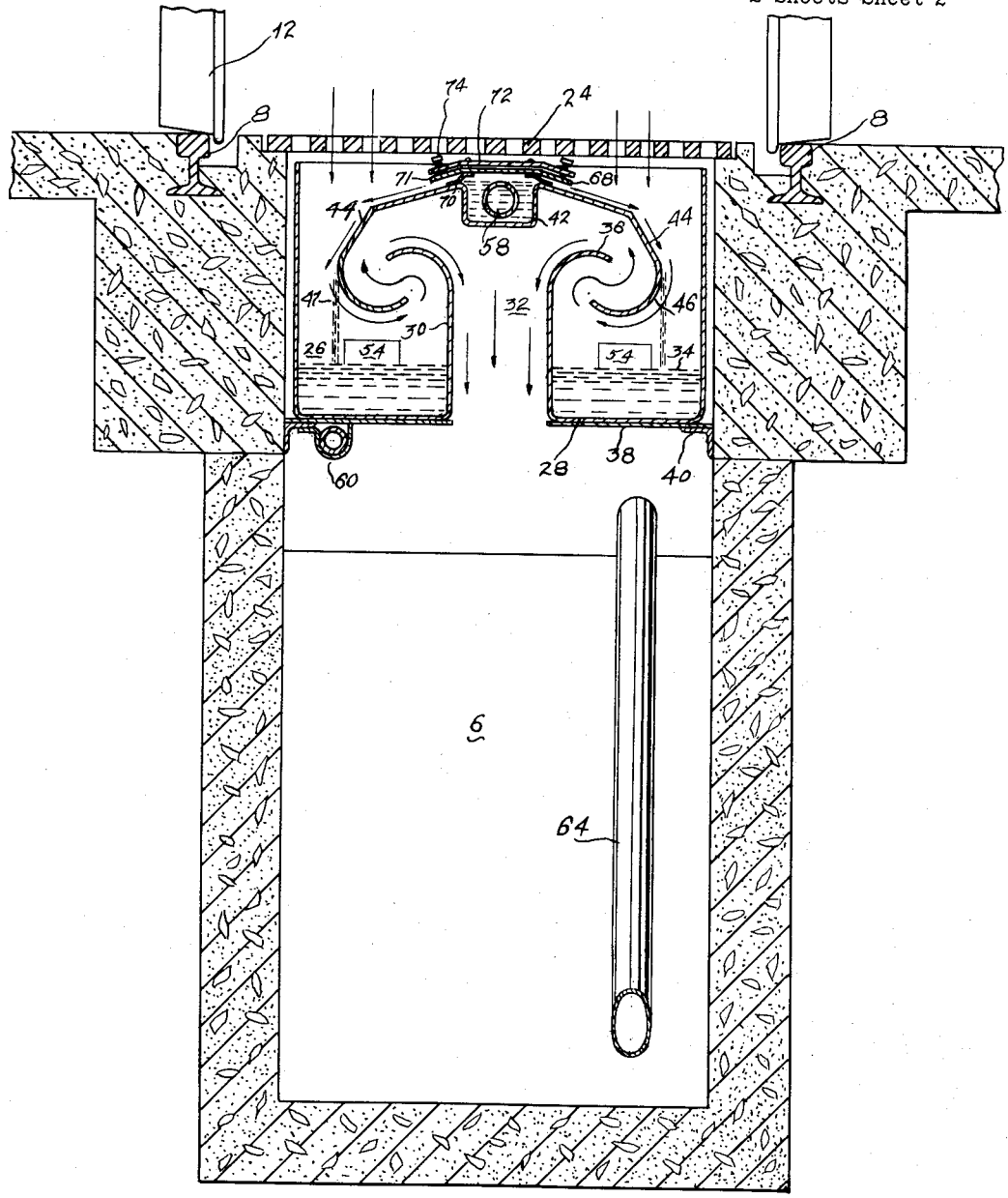
Fig. 2 is an enlarged cross-sectional view through the apparatus taken on line 2—2 of Fig. 1.

Referring now more in detail to the drawings, the apparatus is shown as installed in an air discharge trough 6 cut in the concrete floor of the paint shop between the tracks 8 which support a railway car 10 mounted on wheels 12 in position to be spray painted. Any number of air discharge troughs may be provided in the paint shop according to requirements, and they may be various lengths, each trough having one or more apparatus installed therein. As shown in Figs. 1 and 5, there are two of the apparatus installed in the discharge trough, but it will be understood that this is for purposes of illustration only. The air discharge troughs connect at each end with exhaust ducts 14 provided with fans 16 driven by motors 18 for drawing air therethrough and discharging it to the atmosphere after being cleaned by passage through the apparatus. As shown in Fig. 4, the paint shop may be provided if desired with fresh air ducts as indicated at 20 and an air heating system 22. The discharge trough is covered by a suitable grille or grating 24 through which the air is drawn into and through the paint overspray removing apparatus now to be described.

The apparatus proper comprises a water containing tank generally indicated at 26 from the bottom 28 of which extend spaced apart vertical baffles 30. As will be clearly seen in Fig. 2, the bottom 28 of the tank at each side of its longitudinal center line is continued upwardly to form the upstanding baffles 30, interrupting the tank bottom to provide an air passage 32 from the tank through the bottom. The upstanding baffles 30 terminate above the level 34 of the water in the tank in outwardly curved portions 36. The bottom of the tank is reinforced by stiffening plates 38 and mounted in the discharge trough 6 by any suitable means, such as the angle brackets 40. Mounted in the tank above the upstanding outwardly curved baffles 30 and coextensive therewith is a water trough 42. Aprons 44 extend outwardly and downwardly from opposite sides of the water trough 42 and terminate in inwardly curved portions 46 at a point above the level of water in the tank, but spaced below the curved portions 36 of the baffles 30. As clearly shown in Fig. 2, the outwardly curved upstanding baffles 30 and the inwardly curved aprons 44 together form sinuous air passages leading out of the tank through the bottom thereof into the air discharge trough 6.

Water from the tank 26 is supplied to the water trough 42 for overflow therefrom over the aprons 44 to provide curtains of water, as indicated at 47, falling back into the tank across the entrance to the sinuous air passages. As indicated by the arrows in Fig. 2, the current of air induced by the fans 16 in the exhaust ducts 14 is drawn into the tank through the grating 24 over the water flowing on the aprons and through the water curtains 47 to remove paint overspray therefrom. The current of air then enters the sinuous passages in contact with the baffles 30, which further remove any remaining overspray in the air prior to its discharge through the passage 32 into the trough 6. The water from tank 26 is circulated to provide the water curtains 47 by means of a pump 48 located in a pump chamber 50 mounted in the discharge trough 6 adjacent the inner end wall 52 of the tank. The tank end wall 52 is formed with overflow openings 54 to maintain a predetermined level of water in the tank. The pump chamber 50, as clearly shown in Fig. 3, is arranged to receive overflow of water from the tank 26, the overflow openings 54 each having a splash plate 56 forming an outlet therefrom into the pump chamber. The pump is connected by pipe 58 to one end of the water through 42, the other end thereof being closed by its connection with the opposite end wall of the tank. The pump chamber 50 is connected by pipe 60 with a water supply line, the pipe 60 being provided at its end with a float valve 62 to maintain the maximum level of water in the pump chamber. An overflow pipe 64, as shown in Fig. 3, leads from an overflow sump 66 which receives the water overflow from the pump chamber 50.

The volume of water flow from the water trough 42 over the aprons 44 is controlled by a weir plate 68 mounted on top of the water trough by brackets 70. The weir plate 68 is made of any suitable resilient metal whereby the side edge portions 71 thereof are adapted to be adjustably placed in the path of the water flow from the water trough over the aprons. A rigid adjusting plate 72 is secured on top of the weir plate 68 by any suitable means, such as rivets or welding, and formed with downwardly bent side portions which carry adjusting screws 74. It will thus be seen from Fig. 2 that the volume of water flow over the aprons may be varied or controlled by manipulation of the adjusting screws 74 to either lower or raise the flexible side edge portions 71 of the weir plate 68.

As previously stated, any desired or required number of air discharge troughs may be provided permitting several paint spraying operations to be performed simultaneously in the paint shop. As shown in Fig. 5, the discharge troughs may be provided at their ends with dampers 76 adapted to shut off any of the discharge troughs not in use from communication with the exhaust ducts 14.

It will thus be seen that the apparatus herein described is adaptable to requirements of one or several spraying operations.

The invention may be modified in various respects as will occur to those skilled in the art and the exclusive use of all modifications as come within the scope of the appended claims is contemplated.

What is claimed is:

1. In an apparatus for removing overspray incident to a spray coating operation from a current of air being drawn through the zone thereof, a water containing tank, spaced-apart baffles in said tank upstanding from and interrupting the bottom thereof to form a passage therethrough, a water trough in and coextensive with the length oo the tank above said baffles, aprons extending from the tops of opposite sides of said water trough outwardly and downwardly to a point spaced below the tops of said baffles, said aprons and baffles together forming air passages leading from the tank through the bottom to the exterior thereof, and means for supplying water from the tank to said trough for overflow therefrom over said aprons to provide curtains of water falling back into the tank across the entrance to said air passages, said current of air being drawn into the tank over said flowing water through said water curtains and in contact with the baffles for discharge thereof through said passages exteriorly of the tank.

2. In an apparatus for removing overspray incident to a spray coating operation from a current of air being drawn through the zone thereof, a water containing tank, outwardly curving spaced-apart baffles upstanding from and interrupting the bottom thereof to form a passage therethrough, a water trough in and coextensive with the length of the tank above said baffles, inwardly curving aprons extending from the tops of opposite sides of said water trough outwardly and downwardly to a point spaced below the tops of said baffles, said aprons and baffles together forming sinuous air passages leading from the tank through the bottom to the exterior thereof, means for supplying water from the tank to said trough for overflow therefrom over said aprons to provide curtains of water falling back into the tank across the entrance to said air passages, said current of air being drawn into the tank over said flowing water through said water curtains and in contact with the baffles for discharge thereof through said passages exteriorly of the tank, and means for controlling the volume of water overflow from said trough over said aprons.

3. In an apparatus for removing overspray incident to a spray coating operation from a current of air being drawn through the zone thereof, a water containing tank, outwardly curving spaced-apart baffles in said tank upstanding from and interrupting the bottom thereof to form a passage therethrough, a water trough in and coextensive with the length of the tank above said baffles, inwardly curving aprons extending from the tops of opposite sides of said water trough outwardly and downwardly to a point spaced below the tops of said baffles, said aprons and baffles together forming sinuous air passages leading from the tank through the bottom to the exterior thereof, means for supplying water from the tank to said trough for overflow therefrom over said aprons to provide curtains of water falling back into the tank across the entrance to said air passages, said current of air being drawn into the tank over said flowing water through said water curtains and in contact with the baffles for discharge thereof through said passages exteriorly of the tank, a weir plate mounted on said water trough, and means for adjusting said weir plate to control the volume of water overflow from said trough over said aprons.

4. An apparatus for removing overspray incident to a spray coating operation from a current of air being drawn through the zone thereof comprising, in combination with an air discharge trough, a water containing tank mounted in the discharge trough, spaced-apart baffles in said tank upstanding from and interrupting the bottom thereof to form a passage therethrough, a water trough in and coextensive with the length of the tank above said baffles, aprons extending outwardly from the tops of opposite sides of said water trough and downwardly to a point spaced below the tops of said baffles, said aprons and baffles together forming air passages leading out of the tank through the bottom thereof into said discharge trough, said tank having overflow openings in an end wall thereof for maintaining a predetermined level of water therein, a pump chamber in the air discharge trough receiving overflow of water from the tank, and a pump in said chamber connected with said water trough to supply water from the tank thereto for overflow therefrom over said aprons to provide curtains of water falling back into the tank across the entrance to said air passages, said current of air being drawn into the tank over said flowing water through said water curtains and in contact with the baffles for discharge thereof through said passages into the discharge trough.

5. In an apparatus for removing overspray incident to a spray coating operation from a current of air being drawn through the zone thereof into an air discharge trough, a water containing tank mounted in said discharge trough, spaced-apart baffles in said tank upstanding from and interrupting the bottom thereof to form a passage therethrough, a water trough in and coextensive with the length of the tank above said baffles, oppositely disposed aprons extending outwardly from the tops of the sides of said water trough and downwardly to a point spaced below the tops of said baffles, said aprons forming with said baffles air passages leading out of the tank through the bottom thereof into the discharge trough, said tank having overflow openings in an end wall thereof for maintaining a predetermined level of water therein, a pump chamber in the air discharge trough receiving overflow of water from the tank, a pump in said chamber connected with said water trough to deliver water from said tank thereto for overflow therefrom over said aprons to provide curtains of water falling back into the tank across the entrance to said air passages, said current of air being drawn into the tank over said flowing water through said water curtains and in contact with the baffles for discharge thereof through said passages into the discharge trough, a water supply pipe connected to said pump chamber, and a float valve for maintaining the level of water in said pump chamber.

6. In an apparatus for removing overspray incident to a spray coating operation from a current of air being drawn through the zone thereof, a water containing tank, spaced-apart baffles in said tank upstanding from and interrupting the bottom thereof to form a passage therethrough, spaced-apart oppositely disposed aprons in the tank extending outwardly and above said baffles and downwardly to a point spaced below the tops thereof, said aprons forming with said baffles air passages leading out of the tank through the bottom thereof, a water trough between and in overflow relation to said aprons coextensive with the length thereof, and means for circulating water from the tank to said trough for overflow therefrom over said aprons to provide curtains of water falling back into the tank across the entrance to said air passages, said current of air being drawn into the tank over said flowing water through said water curtains and in contact with the baffles for discharge thereof through said passages exteriorly of said tank.

References Cited in the file of this patent

UNITED STATES PATENTS

| | | |
|---|---|---|
| 1,981,989 | Byer | Nov. 27, 1934 |
| 2,103,521 | Luly | Dec. 28, 1937 |
| 2,545,672 | Pearson | Mar. 20, 1951 |

FOREIGN PATENTS

| | | |
|---|---|---|
| 301,409 | Germany | Oct. 13, 1917 |